US011112267B2

(12) United States Patent
Rothschild

(10) Patent No.: US 11,112,267 B2
(45) Date of Patent: *Sep. 7, 2021

(54) DEVICE, SYSTEM AND METHOD FOR CONTROLLING SPEED OF A VEHICLE USING A POSITIONAL INFORMATION DEVICE

(71) Applicant: Intellectual Ventures II LLC, Wilmington, DE (US)

(72) Inventor: Leigh M. Rothschild, Sunny Isles Beach, FL (US)

(73) Assignee: INTELLECTUAL VENTURES II LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/925,940

(22) Filed: Jul. 10, 2020

(65) Prior Publication Data

US 2020/0408563 A1 Dec. 31, 2020

Related U.S. Application Data

(63) Continuation of application No. 16/510,063, filed on Jul. 12, 2019, now Pat. No. 10,712,171, which is a
(Continued)

(51) Int. Cl.
*G08G 3/00* (2006.01)
*G01C 21/36* (2006.01)
(Continued)

(52) U.S. Cl.
CPC ........ *G01C 21/3697* (2013.01); *B60K 31/185* (2013.01); *G01C 21/3415* (2013.01);
(Continued)

(58) Field of Classification Search
CPC ............ B60K 31/185; B60W 2555/60; B60W 2556/50; G07C 5/008; G07C 5/02;
(Continued)

(56) References Cited

U.S. PATENT DOCUMENTS 3,986,167 A 10/1976 Paul
5,276,908 A 1/1994 Koohgoli et al.
(Continued)

OTHER PUBLICATIONS

Reddy et al., On Board Assistant to GPS Navigation of Vehicles, 2009, IEEE, p. 1-7 (Year: 2009).*

(Continued)

*Primary Examiner* — McDieunel Marc
(74) *Attorney, Agent, or Firm* — Christensen O'Connor Johnson Kindness PLLC

(57) ABSTRACT

A device, system and method for controlling speed of a vehicle are provided. The device includes a locational information module for determining location information and speed; a storage module for storing at least one geographic map including at least one route and a speed limit for the at least one route; a processing module configured to receive the location information, retrieve at least one geographic map based on the location information, determine a speed limit based on the location information and compare the speed of the device to the determined speed limit; and a display module for alerting a user if the speed of the device exceeds the determined speed limit. The system and method can be for communicating a subject vehicle's speed to a central server where it can be utilized to analyze traffic congestion patterns or notify selected companies or individuals.

17 Claims, 6 Drawing Sheets

Related U.S. Application Data continuation of application No. 15/784,419, filed on Oct. 16, 2017, now Pat. No. 10,352,722, which is a continuation of application No. 15/076,178, filed on Mar. 21, 2016, now Pat. No. 9,791,294, which is a continuation of application No. 14/618,739, filed on Feb. 10, 2015, now Pat. No. 9,291,475, which is a continuation of application No. 14/057,713, filed on Oct. 18, 2013, now Pat. No. 8,972,146, which is a continuation of application No. 13/738,133, filed on Jan. 10, 2013, now Pat. No. 8,600,641, which is a continuation of application No. 12/770,225, filed on Apr. 29, 2010, now Pat. No. 8,386,145, which is a continuation of application No. 11/233,199, filed on Sep. 22, 2005, now Pat. No. 7,783,406.

(51) Int. Cl.
*G07C 5/02* (2006.01)
*G07C 5/00* (2006.01)
*B60K 31/18* (2006.01)
*G08G 1/052* (2006.01)
*G08G 1/0967* (2006.01)
*G01C 21/34* (2006.01)

(52) U.S. Cl.
CPC ............... *G07C 5/008* (2013.01); *G07C 5/02* (2013.01); *G08G 1/052* (2013.01); *G08G 1/096725* (2013.01); *G08G 1/096741* (2013.01); *G08G 1/096791* (2013.01); *G08G 3/00* (2013.01); *B60W 2555/60* (2020.02); *B60W 2556/50* (2020.02)

(58) Field of Classification Search
CPC ............. G08G 1/052; G08G 1/096725; G08G 1/096741; G08G 1/096791; G08G 3/00
See application file for complete search history.

(56) References Cited

U.S. PATENT DOCUMENTS

| | | | |
|---|---|---|---|
| 5,626,335 A | 5/1997 | Radwanski et al. | |
| 5,654,718 A | 8/1997 | Beason et al. | |
| 5,819,198 A | 10/1998 | Peretz | |
| 6,424,835 B1 | 7/2002 | Shin | |
| 6,429,812 B1 | 8/2002 | Hoffberg | |
| 6,526,335 B1 | 2/2003 | Treyz et al. | |
| 6,775,612 B1 | 8/2004 | Kao et al. | |
| 6,791,472 B1 | 9/2004 | Hoffberg | |
| 7,268,700 B1 | 9/2007 | Hoffberg | |
| 7,271,737 B1 | 9/2007 | Hoffberg | |
| 7,298,289 B1 | 11/2007 | Hoffberg | |
| 7,412,202 B2 | 8/2008 | Gutta et al. | |
| 7,421,334 B2 | 9/2008 | Dahlgren et al. | |
| 7,659,827 B2 | 2/2010 | Gunderson et al. | |
| 7,783,406 B2 * | 8/2010 | Rothschild ......... | G01C 21/3415 701/93 |
| 7,986,339 B2 | 7/2011 | Higgins | |
| 8,031,084 B2 | 10/2011 | Rothschild | |
| 8,046,169 B2 | 10/2011 | Mazlum et al. | |
| 8,233,919 B2 | 7/2012 | Haag et al. | |
| 8,265,868 B2 * | 9/2012 | Cho ....................... | G08G 1/092 701/414 |
| 8,374,784 B2 | 2/2013 | Mazlum et al. | |
| 8,386,145 B2 * | 2/2013 | Rothschild ....... | G08G 1/096791 701/93 |
| 8,600,641 B2 * | 12/2013 | Rothschild ............. | G08G 1/052 701/93 |
| 8,626,437 B2 * | 1/2014 | Yun .................. | G08G 1/096827 701/410 |
| 8,698,895 B2 | 4/2014 | Nerayoff et al. | |
| 8,890,717 B2 | 11/2014 | McClellan et al. | |
| 8,972,146 B2 * | 3/2015 | Rothschild ......... | G01C 21/3415 701/93 |
| 9,104,535 B1 | 8/2015 | Brinkmann et al. | |
| 9,286,795 B2 * | 3/2016 | Vorona ................. | G08G 1/0112 |
| 9,291,475 B2 | 3/2016 | Rothschild | |
| 9,302,687 B2 | 4/2016 | Cross | |
| 9,489,839 B2 | 11/2016 | Nerayoff et al. | |
| 9,751,543 B2 | 9/2017 | Cross | |
| 9,791,294 B2 * | 10/2017 | Rothschild ............. | G07C 5/008 |
| 10,029,696 B1 | 7/2018 | Ferguson | |
| 10,352,722 B2 * | 7/2019 | Rothschild ............. | G07C 5/008 |
| 2002/0016653 A1 | 2/2002 | Levine | |
| 2002/0142722 A1 | 10/2002 | Gutta et al. | |
| 2003/0067562 A1 | 4/2003 | Hafner et al. | |
| 2004/0073361 A1 | 4/2004 | Tzamaloukas et al. | |
| 2004/0239531 A1 | 12/2004 | Adamczyk | |
| 2006/0167784 A1 | 7/2006 | Hoffberg | |
| 2007/0067086 A1 | 3/2007 | Rothschild | |
| 2007/0087756 A1 | 4/2007 | Hoffberg | |
| 2009/0082950 A1 | 3/2009 | Vorona | |
| 2010/0007523 A1 | 1/2010 | Hatav | |
| 2011/0258044 A1 | 10/2011 | Kargupta | |
| 2014/0272811 A1 | 9/2014 | Palan | |
| 2015/0039214 A1 | 2/2015 | McClellan et al. | |

OTHER PUBLICATIONS

Lakas et al., Detection and dissipation of road traffic congestion using vehicular communication, 2009, IEEE, p. 1-6 (Year: 2009).*
Khorashadi et al., Smoothing Vehicular Traffic Flow Using Vehicular-Based Ad Hoc Networking & Computing Grid (VGrid), 2006, IEEE, p. 1-6 (Year: 2006).*
LLarri et al., A Data Management Perspective on Vehicular Networks, 2015, IEEE, p. 2420-2460 (Year: 2015).*
Kölbl, R. et al., "Probe Vehicle: A Comparison of Motorway Performance Measure With Other Motorway Flow Detection Techniques," Eleventh International Conference on Road Transport Information and Control, Mar. 19-21, 2002, London, pp. 182-186.
Masters, P.H., et al., "An Approach to Provision of Real-Time Driver Information Through Changeable Message Signs," Vehicle Navigation and Information Systems Conference, Sep. 11-13, 1989, Toronto, pp. 413-423.
Chisalita, I. and N. Shahmehri, "An In-Vehicle Approach for Improving Traffic Safety Through GIS Utilization," Department of Computer and Information Science, Linkoping University, IEEE International Conference on Systems, Man and Cybernetics, Yasmine Hammamet, Tunisia, Oct. 6-9, 2002, vol. 7, 6 pages.
Lapp, T., "Model Predictive Control Based Trajectory Optimization for Nap-of-the-Earth (NOE) Flight Including Obstacle Avoidance," Proceeding of the 2004 American Control Conference, Boston, Massachusetts, Jun. 30-Jul. 2, 2004, IEEE, vol. 6, pp. 891-896.
Li, X.R. and V.P. Jilkov, "Survey of Maneuvering Target Tracking. Part V: Multiple-Model Methods," IEEE Transactions on Aerospace and Electronic Systems, 41(4):1255-1321, Nov. 2005.
Angelo, S., et al., "Remote Ride Quality Monitoring of Acela Train Set Performance," Proceedings of the 2002 ASME/IEEE Joint Railroad Conference, Washington D.C., Apr. 23-25, 2002, IEEE, pp. 171-178.
Barth, M., et al., "A Hybrid Communication Architecture for Intelligent Shared Vehicle Systems," Proceedings of the 2002 Intelligent Vehicle Symposium, Versailles, France, Jun. 17-21, 2002, IEEE, vol. 2, pp. 557-563.
Boer, E.R., et al., "Method for Evaluating Human and Simulated Drivers in Real Traffic Situations," Proceedings of the 46th Vehicular Technology Conference, Atlanta, Jan. 1996, IEEE, vol. 3, pp. 1810-1814.
Chandrasekar, P., et al., "A Simulation-Driven Internet-Based Predictive Traffic Information Hub," The IEEE 5th International Conference on Intelligent Transportation Systems, Singapore, Sep. 3-6, 2002, IEEE, pp. 679-684.

* cited by examiner

DEVICE, SYSTEM AND METHOD FOR CONTROLLING SPEED OF A VEHICLE USING A POSITIONAL INFORMATION DEVICE

CROSS REFERENCE TO RELATED APPLICATIONS

This application is a continuation of U.S. patent application Ser. No. 16/510,063, filed Jul. 12, 2019, now U.S. Pat. No. 10,712,171, issued Jul. 14, 2020, which is a continuation of Ser. No. 15/784,419, filed Oct. 16, 2017, now U.S. Pat. No. 10,352,722, issued Jul. 16, 2019, which is a continuation of U.S. patent application Ser. No. 15/076,178, filed Mar. 21, 2016, now U.S. Pat. No. 9,791,294, issued Oct. 17, 2017, which is a continuation of U.S. patent application Ser. No. 14/618,739, filed Feb. 10, 2015, now U.S. Pat. No. 9,291,475, issued Mar. 22, 2016, which is a continuation of U.S. patent application Ser. No. 14/057,713, filed Oct. 18, 2013, now U.S. Pat. No. 8,972,146, issued Mar. 3, 2015, which is a continuation of U.S. patent application Ser. No. 13/738,133, filed Jan. 10, 2013, now U.S. Pat. No. 8,600,641, issued Dec. 3, 2013, which is a continuation of U.S. patent application Ser. No. 12/770,225, filed Apr. 29, 2010, now U.S. Pat. No. 8,386,145, issued Feb. 26, 2013, which is a continuation of U.S. patent application Ser. No. 11/233,199, filed Sep. 22, 2005, now U.S. Pat. No. 7,783,406, issued Aug. 24, 2010, all of which are hereby incorporated by reference in their entirety.

TECHNICAL FIELD

The present disclosure relates generally to navigational or positional information systems, and more particularly, to devices, systems and methods for controlling a speed of a vehicle using a positional information device, e.g., a global positioning system (GPS) device.

BACKGROUND

GPS (Global Positioning System) devices are everywhere. These devices provide a user with such information as latitude and longitude, accurate time, heading, velocity, etc. GPS devices are particularly useful in automobiles and other vehicles. Many individuals have multiple GPS devices if they own, for instance, two cars that both have the device. Conventionally, most devices will allow a user to store information such as address points in the internal memory of the device. Some devices will allow you to store this information on removable memory, e.g., memory cards, optical media, etc. In the latter case, this can be particularly helpful because a list of addresses, for instance, will be useful to be moved from GPS device (e.g., a first vehicle) to GPS device (e.g., a second vehicle).

Conventionally, a GPS device will inform a user how to get from one point to another. Additionally, it provides information on points of interest, e.g., hotels, restaurants, historic landmarks, etc. Some GPS units will also provide information including current speed of travel as well as average speed of travel.

As a driver moves his vehicle (e.g., boat or car), speed limits change quite rapidly. It is quite common for a driver to be unaware that he was violating the speed limit. That claim is made every day as drivers are ticketed. Radar detectors, which are quite common, only tell the driver if a law enforcement person is in the area and trying to catch speeders. Either these detectors do not work, or they work too late to avoid law enforcement problems. They also are difficult to place in a vehicle and many law enforcement agencies frown on these devices, in fact, radar detectors are illegal in some states. Of course, in all cases, radar detectors do not let the user know the speed that he is traveling. Thus, a need exists for techniques of alerting a driver as to the speed limit of any road traveled, and if they are violating or obeying that speed limit.

In another related area, a need also exists to inform an outside selected source as to what speed various vehicles are driving on a particular roadway or waterway. If, for instance, the speed limit of a road is 65 miles per hour (e.g., on a highway) and an individual or computer detected that several vehicles in the same location were traveling at 10 miles per hour (during a certain time period) then that information source could report a traffic slowdown on that road. This information is valuable to local authorities (to alert them to a traffic accident for instance) and also very valuable to other motorists (or boaters), who could receive this information on their GPS unit or through another source such as a traffic radio station.

SUMMARY

A device, system and method for controlling speed of a vehicle are provided. The present disclosure enables a position information device, e.g., a GPS (global position system) unit, to alert a user if they are violating a local speeding limit. The present disclosure further provides for a system and method for communicating a subject vehicle's speed to a central server where it can be utilized to analyze traffic congestion patterns or notify selected companies or individuals.

According to one aspect of the present disclosure, a device includes a locational information module for determining location information and speed of the device; a storage module for storing at least one geographic map including at least one route and a speed limit for the at least one route; a processing module configured to receive the location information, retrieve at least one geographic map based on the location information, determine a speed limit based on the location information and compare the speed of the device to the determined speed limit; and a display module for alerting a user if the speed of the device exceeds the determined speed limit.

In another embodiment of the present disclosure, a method for controlling speed of a vehicle includes determining location information of the vehicle; retrieving at least one geographic map based on the location information, the at least one geographic map including at least one route and a speed limit for the at least one route; determining a speed of the vehicle; determining a speed limit based on the location information; comparing the speed of the vehicle to the determined speed limit; and alerting a user if the speed of the vehicle exceeds the determined speed limit. The method further includes reducing the speed of the vehicle below the determined speed limit.

In a further embodiment, a system for processing location information is provided. The system includes at least one device including a locational information module for determining location information and speed of the at least one device; and a transmission module for transmitting the location information and speed of the at least one device to a server; the server including a database for storing at least one geographic map including at least one route and a speed limit for the at least one route, the server being adapted to access at least one map based on the transmitted location information and to determine if the speed of the at least one device is within the speed limit; and a communications network for coupling the at least one device to the server.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF ILLUSTRATIVE EMBODIMENTS

Preferred embodiments of the present disclosure will be described hereinbelow with reference to the accompanying drawings. In the following description, well-known functions or constructions are not described in detail to avoid obscuring the present disclosure in unnecessary detail.

Figure 1:
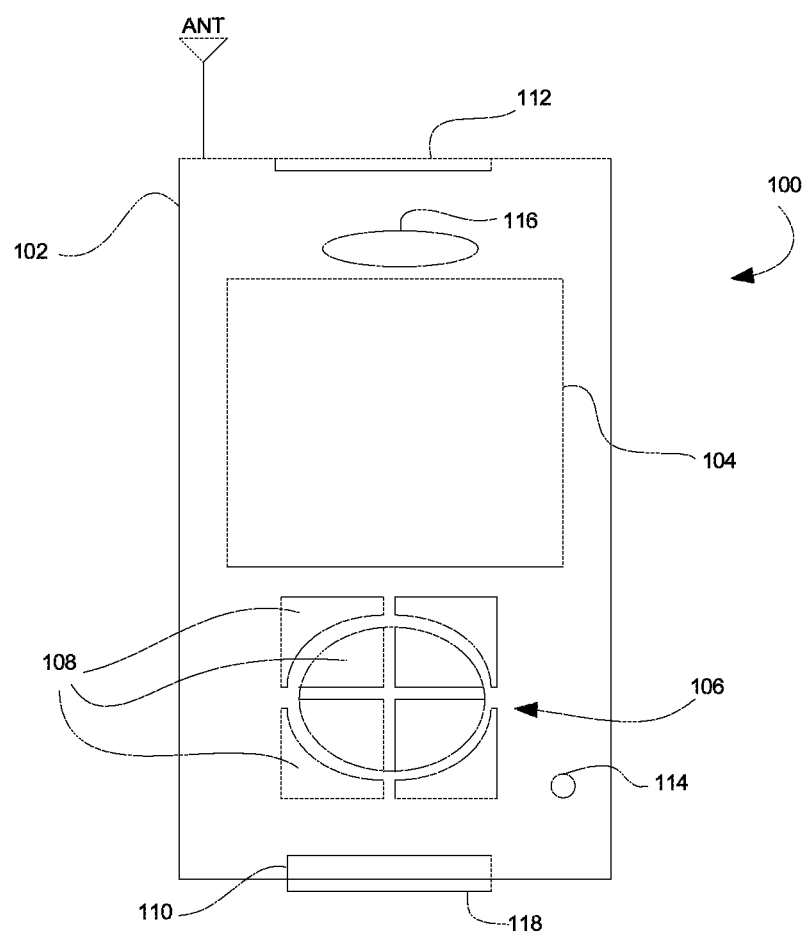
FIG. 1 is front view of a device for controlling speed of a vehicle according to an embodiment of the present disclosure.

Referring to FIG. 1, a global positioning system (GPS) device 100 for controlling speed of a vehicle containing the device in accordance with an embodiment of the present disclosure is illustrated. Although the device shown and described in relation to FIG. 1 is a hand-held device, it is to be understood the principles of the present disclosure may be applied to any type of navigation or positional information device including but not limited to a vehicle-mounted device, a GPS receiver coupled to a desktop computer or laptop, etc. Furthermore, the present disclosure may apply to various types of vehicles such as an automobile, a boat, a bicycle, etc.

The GPS device 100 includes various electrical components, which will be described in detail below, disposed in a generally rectangular housing 102. A display module 104 is provided for displaying a location of a user, a map, coordinates, waypoints, frequently accessed addresses, personal information, etc. As will be described in more detail below, the display module 104 may include a touch screen for facilitating user input of information. Input module 106 includes a plurality of buttons 108 for inputting data and navigating through a plurality of menus and/or maps. The GPS device 100 further includes a storage module 110 for storing a plurality of maps, frequently used addresses, traveled routes, etc. and a transmission module 112 for transmitting stored data to another device, e.g., a personal computer, a personal digital assistant (PDA), a server residing on the Internet, etc. Optionally, the device 100 may include a microphone 114 for acquiring audio from the user of the device to input data and a speaker 116 for audibly producing directions, warnings and/or alarms to a user.

Figure 2:
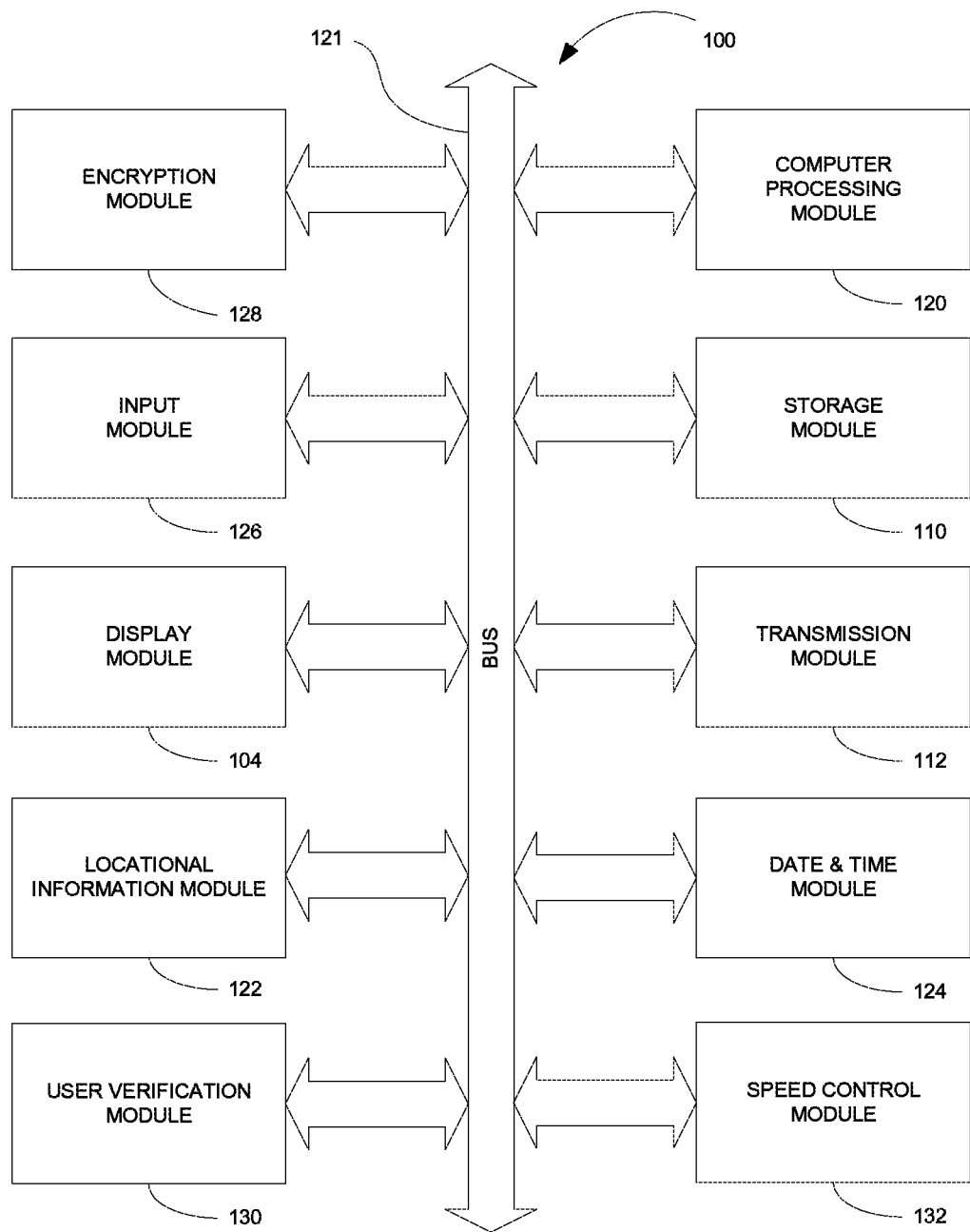
FIG. 2 is a block diagram of various modules included in the device illustrated in FIG. 1.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system.

It is to be further understood that because some of the constituent device components and method steps depicted in the accompanying figures may be implemented in software, the actual connections between the device components (or the process steps) may differ depending upon the manner in which the present disclosure is programmed. Given the teachings of the present disclosure provided herein, one of ordinary skill in the related art will be able to contemplate these and similar implementations or configurations of the present disclosure.

A locational information module 122 will be provided for determining a location of the device 100 and/or user. The locational information module 122 may include a receiver and antenna ANT employing conventional locational information processing technology such as Global Positioning Satellite (GPS) Technology, Loran Technology, or any other available locational technology, to indicate the exact location, e.g., latitude, longitude and altitude, of the device 100. Exemplary GPS receivers and antennas are described in U.S. Pat. Nos. 5,654,718 and 6,775,612, the contents of both of which are herein incorporated by reference. It is to be appreciated that the latitude, longitude and altitude may be used to interact with maps stored in memory or in the storage module 110 of device 100 to determine the city, state or address of the location the device 100. Furthermore, the locational information module 122 may calculate routes traveled, velocity or speed of a vehicle including the device 100, etc., or alternatively, may send the position coordinates to the processing module 120 at a predetermined sampling period where the processing module will perform the calculations.

Furthermore, the device 100 will include a date and time module 124. The date and time module 124 will use standard computer chip processing technology widely in use, or alternatively, input from locational information module 122, e.g., a GPS receiver, to supply the date and time. The date and time may be associated or correlated with routes traveled, a particular location and speeds and may be employed to determine velocity or speed of the user of the device 100 whether in a vehicle, on a bicycle or while walking.

The device 100 will also contain a display module 104 for displaying a location of a user, a map, coordinates, waypoints, frequently accessed addresses, etc. This display may be in any current form in the art, including Liquid Crystal Displays (LCD), Light emitting diode displays (LED), Cathode Ray Tube Displays (CRT) or any other type of display currently existing or existing in the future. The display module 104 may also include an audio output device 116, e.g., a speaker, headphone jack, etc., allowing the user to also hear audio output from the device 100, e.g., audibly producing directions to a desired location or predetermined address.

The device 100 of the present disclosure will contain a user input module 126 to either receive user instructions via text input by the way of buttons 108, a standard keyboard interface coupled to the device, or a character recognition capture device which translates user text input into alphanumeric characters. Preferably, the character recognition device is a touch screen which overlays the display module 104 and text is entered via a pen-like stylus. Such input devices are standard and currently available on many electronic devices including portable digital assistants (PDAs) and cellular telephones. Optionally, a microphone 114 may be further coupled to the input module 126 for capturing any audio information spoken by the user and the input module will further include an analog-to-digital (A/D) converter for converting the spoken audio information into a digital format. Furthermore, the input module may include a voice recognition processor that translates the digital human voice into alpha numeric characters for user input. The user will utilize the user input module 126 to enter various data, for example, a plurality of destination addresses, waypoints, etc.

The storage module 110 includes internal storage memory, e.g., random access memory (RAM), or removable memory such as magnetic storage memory; optical storage memory, e.g., the various known types of CD and DVD media; solid-state storage memory, e.g., a CompactFlash card, a Memory Stick, SmartMedia card, MultiMediaCard (MMC), SD (Secure Digital) memory; or any other memory storage that exists currently or will exist in the future. The storage module 110 will store various types of information such as the inputted destination addresses, routes traveled by the user, the user's home address, etc. The storage module 110 will further store a plurality of geographical maps. In operation, the processing module 120 will process information received from overhead satellites and calculate the geographic location that the device 100 is currently at. The processing module 120 then plots that location on a graphic representation of a map stored in the storage module 110, e.g., internal or external memory. This map is then displayed on the display module 104 of the device 100. The map optionally will include points of interest also plotted on the map. By example, hospitals, police offices, gas stations, ATMs, hotels, restaurants, etc. can also be displayed. These point of interest locations are placed on the map in their proper locations by the publisher of the map when the map is published, or alternatively, these locations are stored in an internal address database and then dynamically placed on the graphical representation map by the processing module 120 as the map displays on the display module 104.

Maps may be provided for different areas via multiple removable memory cards, e.g., a memory card for each state in the United States. Alternatively, different maps may be received wirelessly via the transmission module 112 and loaded into memory or the storage module 110 as needed. The processing module 120 will determine based on the information received from the locational information module 122 that a map corresponding to the devices current position is not available and the processing module 120 will request an appropriate map from a service provider available on a communication network accessed via the transmission module 112.

The transmission module 112 will enable the device 100 to transmit or transfer information, e.g., current location of a vehicle, speed of a vehicle, time and date of the recorded location and/or speed, etc., to other computing devices and to receive information from other computing devices, e.g., maps, software updates, etc. The transmission module 112 will perform its functionality by hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 802.11.X (where x denotes the type of transmission), or any other type of communication protocols or systems currently existing or to be developed for wirelessly transmitting data. The transmission module will compress and encode the encrypted information for transmission using any known wireless communication technology.

The device 100 will also include an encryption module 128. The encryption module 128 will use conventional code encryption algorithms currently in use or that will be in use in the future such as symmetric-key algorithms, e.g., DES, Triple-DES, Blowfish, RC2, RC4, RC5, etc., and asymmetric-key algorithms, e.g., Diffie-Hellman, RSA, ElGamal, etc. to encrypt the data information that comes into the user input module 126 and/or that is stored in the storage module 110. In one embodiment of the present disclosure, the encryption module 128 will always encrypt the data information, but in other embodiments, the user will select whether to encrypt the data or to leave the data unencrypted.

Upon initialization of device 100, processing module 120 prompts the user via display module 104 or speaker 116 to select a code string that the user wishes to use. The user selects an appropriate code string and enters the code string into the device 100 with input module 126 via buttons 108, microphone 114 or touch screen. The input module 126 sends the code string to the processing module which in turn sends this string to encryption module 128. The encryption module 128 then uses this code string to encrypt (using standard encryption algorithms identified above) all addresses and route points (or just the addresses and route points that the user designates) and store this information in the storage module 110. When the GPS device 100 is inactive, all information in the storage module 110 is encrypted. When the GPS device 100 is active, the information in the storage module 110 is sent to the encryption module 128 which after receiving the user's code string decrypts the information, and then sends the information to the processing module where it can then be presented to the user on the display module 104.

In another embodiment of the present disclosure, the GPS device 100 will include a hardware interlock 118 to prevent the removal of the storage module 110. The interlock 118 may be a detent configured to engage a memory card being employed, a mechanical door which prevents access to the storage module 110, or a mechanism which physical rejects the storage module 110. In this embodiment, the user would submit the code string to the encryption module 128 via the input module 126 which would then accept the code string and instruct the processing module 120 to unlock the hardware interlock 118 and allow user removal of the storage module 110. If the code string is not accepted, the storage module 110 will not be able to be removed.

In another embodiment, the device 100 will further include a user verification module (UVM) 130. The user verification module 130 will indicate and verify the identity of the user of the device 100. The user verification module 130 may execute a password protection algorithm or may include an identity capture device, either incorporated into the device 100 or coupled externally via a cable. The identity capture device may be a biometric device, such as a retinal scanning device, finger print reader, facial recognition reader or another type of user identity verification input device which will collect information on the user to be compared to information that has previously been stored in the device's memory. One such exemplary fingerprint reader is the BioTouch™ fingerprint reader commercially available from Identix Incorporated of Minnetonka, Minn. It is to be noted that identity detection devices such as biometric devices are common and are currently widely in use. It is to be further noted, that identity verification devices that are not yet in use such as DNA detection, etc., would also be compatible with device 100. In this embodiment, the identity of the user may be required in addition to the entering of a code string to decrypt information on the storage module 110. In a further embodiment, the identity of a particular user may be linked to their code string and, upon verification of the identity of a user, the linked code string will be submitted to the encryption module 128. In another embodiment, the identity of the user may be required to unlock the interlock 118.

Figure 3:
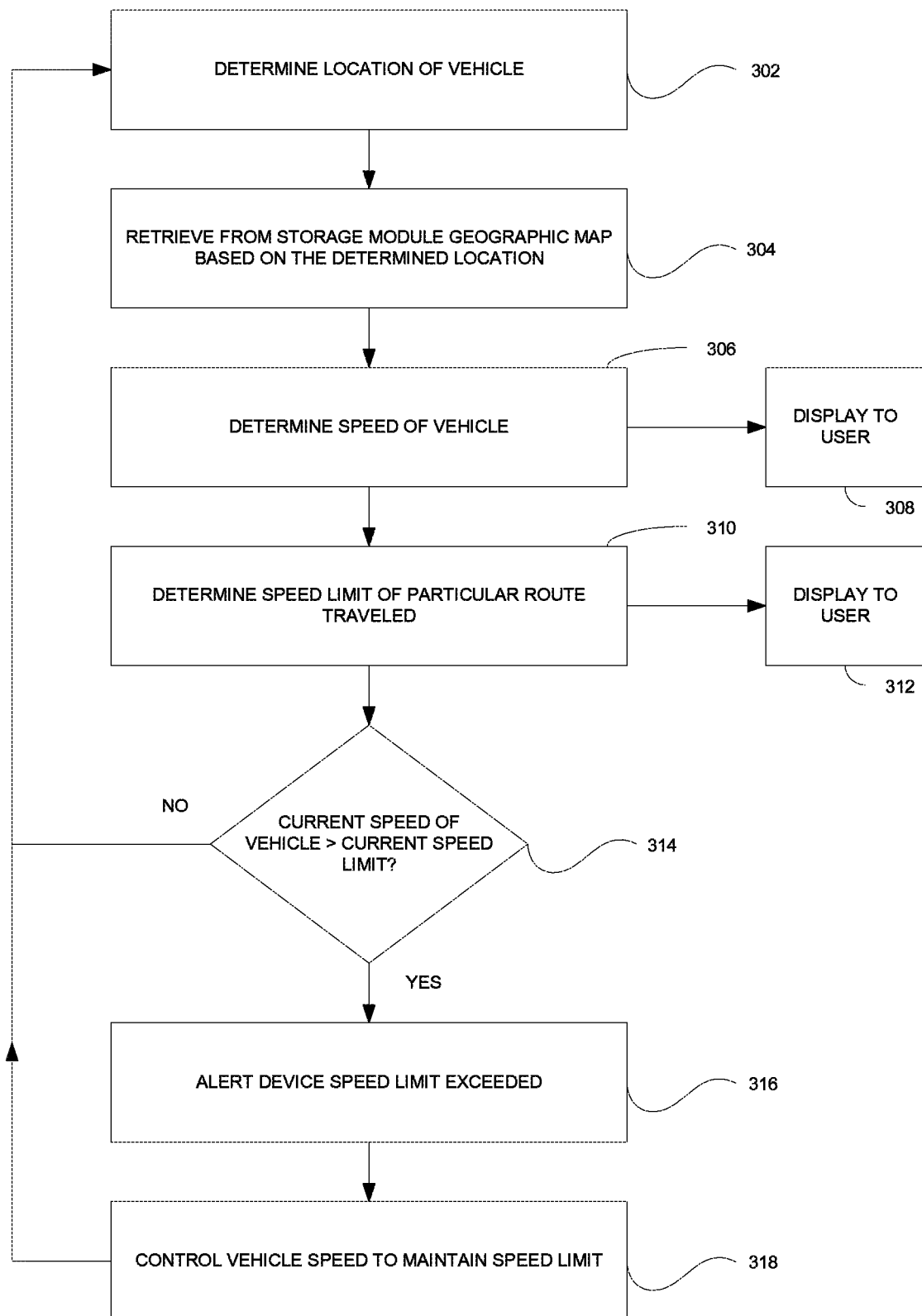
FIG. 3 is a flow diagram illustrating a method for controlling speed of a vehicle according to an embodiment of the present disclosure.

In one embodiment of the present disclosure, the geographic maps employed by the device 100 will include speed limit information for the area represented by the map. A publisher of the geographic maps would now add to any map the speed limit of a particular location. The publisher would, for any road, need to plot all speed limits by geographical location. This information is widely available to the publisher from the local, state or federal agencies that maintain the roads or through surveyors who can collect information on the roadways or waterways. Once plotted, this information would be stored along and attached to the geographic representation (e.g., map) for that particular road. Alternatively, as with points of interest discussed above, the speed limits may be stored in a database with a particular address (e.g., longitude and latitude) assigned. The geographic maps including speed limit information may now be used to control the speed of a vehicle as will be described below with reference to FIGS. 3, 4A and 4B.

Figure 4A:
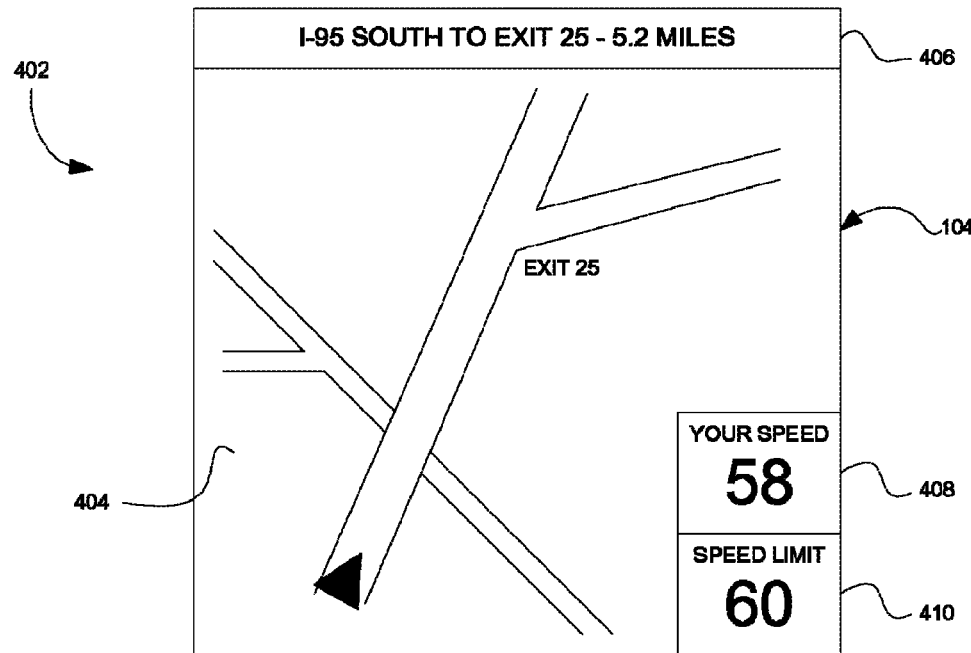
FIGS. 4A and 4B are exemplary screen shots shown on a display module of the device shown in FIG. 1.

When the device 100 is powered on and functioning, the device will obtain the locational information (from the overhead satellites) to allow the processing module 120 to determine the device's specific location (step 302). As described above, this will cause a corresponding map to appear on the display module 104, wherein the processing module 120 will retrieve from storage module 110 a geographic map based on the determined location (step 304). FIG. 4A is an exemplary screen shot 402 of a map 404 being displayed on the display module 104. The user's current position is represented by the arrow on a particular roadway he is traveling on; here, for example, the user is traveling south on I-95. A portion 406 of the display module 104 may indicate to the user directions to an inputted destination.

Next, the processing module 120 will determine a speed of the vehicle (step 306). The speed of the vehicle can be determined in many ways as is known in the art, for example, measuring the time elapsed and distance between two specific points. Once the speed is determined, the user's speed will be displayed on a portion 408 of the display module 104 (step 308). It is to be appreciated the display module may be segregated into a plurality of sections or portions for displaying different types of information.

The processing module 120 will then determine the speed limit for the particular route traveled (step 310). The processing module will look for the location that the vehicle is at and look for the last speed limit indication plotted on the map closest to that location, and indicate to the user the speed limit of the current road (or waterway) that the driver (or boater) is on and post that limit on portion 410 of the display module 104 (step 312).

Figure 4B:
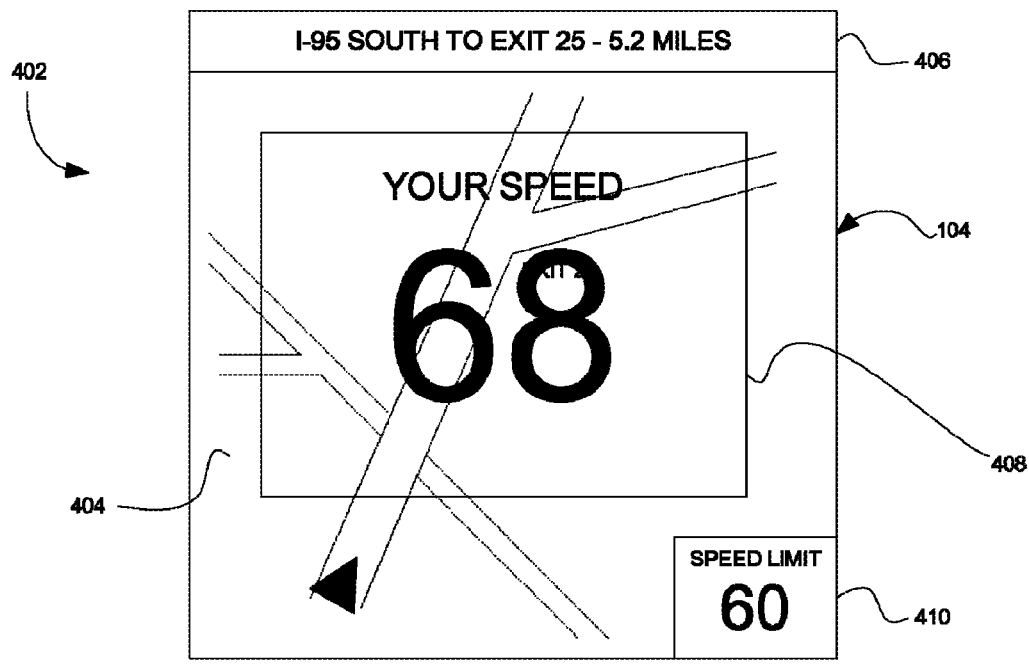

Optionally, the processing module 120 of the device 100 will also compare the determined speed limit to the current rate of speed of the vehicle, and will generate an alert if the user is moving the vehicle in excess of the posted limit. The processing module 120 will determine if the current speed of the vehicle is greater than the current speed limit (step 314). If the vehicle's current speed is not greater than the current speed limit, the device will continuously update the vehicle's location, the speed limit of the location and determine whether the vehicle is exceeding the speed limit (steps 302 through 314). Otherwise, if the current speed of the vehicle is greater than the current speed limit, the device will alert the user that they are exceeding the current speed limit (step 316). The alert may be visual, e.g., a text message on the display module, or audible, e.g., a tone or beep. In one embodiment, the portion 408 displaying the user's current speed may be overlaid on the map 404 as shown in FIG. 4B. The overlaid portion may be flashing or in a different color than in a normal condition. In another embodiment, the alert may be spoken to the user via an optional text-to-speech module (not shown).

In another embodiment, if the vehicle is exceeding the current speed limit, the device 100 will control the vehicle's speed to maintain the current speed limit (step 318). In this embodiment, the device will include a speed control module 132 which will interface with an onboard processor of the vehicle and will transmit a control signal to lower the vehicle's speed. Onboard processors for controlling speed of a vehicle are known in the art such as a cruise control mechanism.

In a further embodiment, the processing module 120 will be instructed via a computer algorithm to assume that the speed limit is the last speed limit that was posted in the location that the vehicle has now gone past, but will also have error trapping built-in to the algorithm to warn the user on the display module if the next speed indication does not appear within a reasonable period of time or distance. The user may input to the device a predetermined period of time or distance that, if elapsed, the processing module 120 will generate a warning or alert to the user that the speed limit has not changed. This will allow the user to be aware that the previously posted speed limit may no longer be accurate.

In yet another embodiment, the processing module 120 will correlate a time and date to a particular location and the user's speed at that location and will store this information in the storage module 110. Optionally, this information may be encrypted before being stored in the storage module 110. This information may then be extracted at a later time for analysis.

Figure 5:
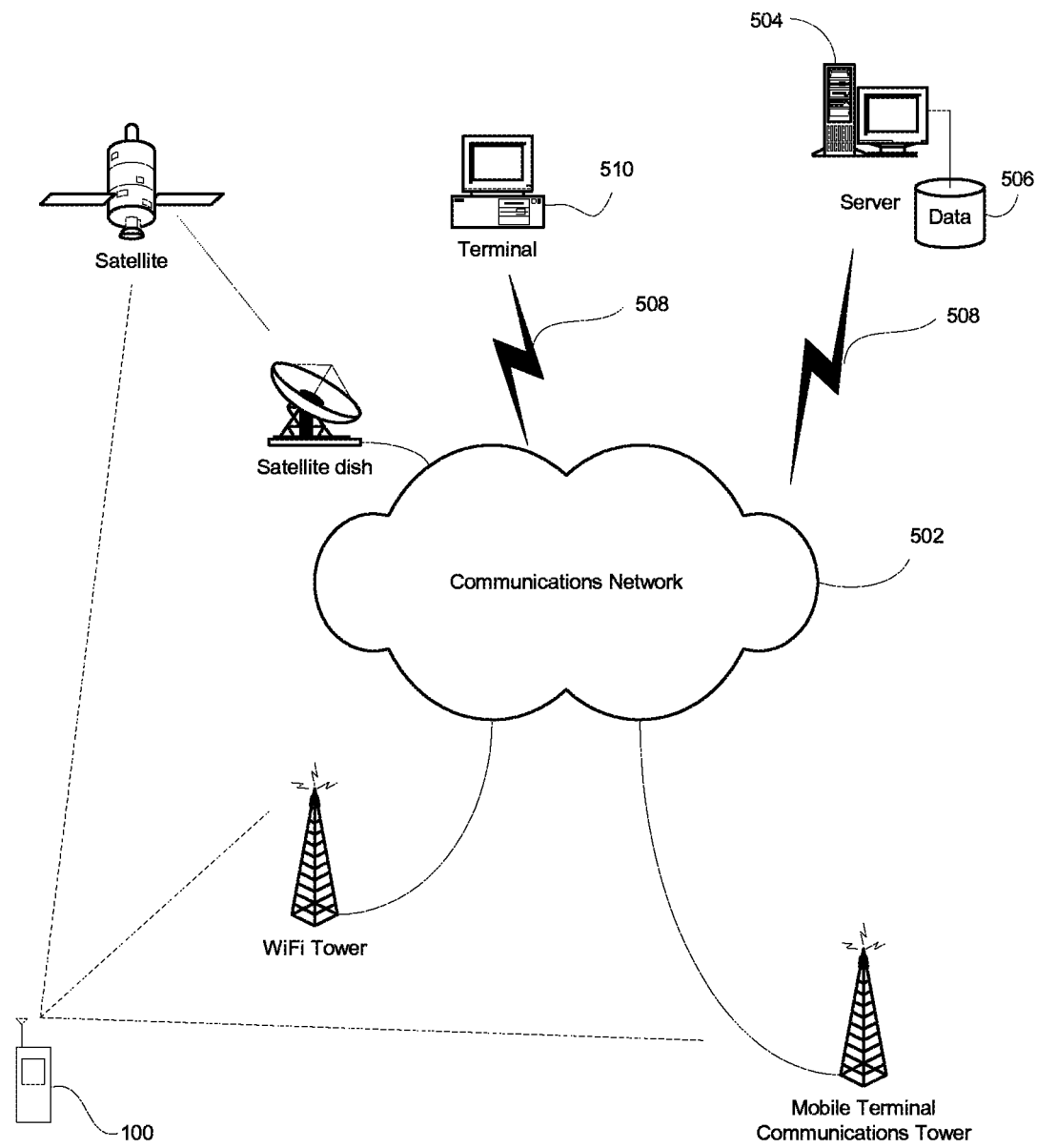
FIG. 5 is a diagram of an exemplary system for providing information to a plurality of vehicles based on location and speed of the plurality of vehicles in accordance with an embodiment of the present disclosure.
Figure 6:
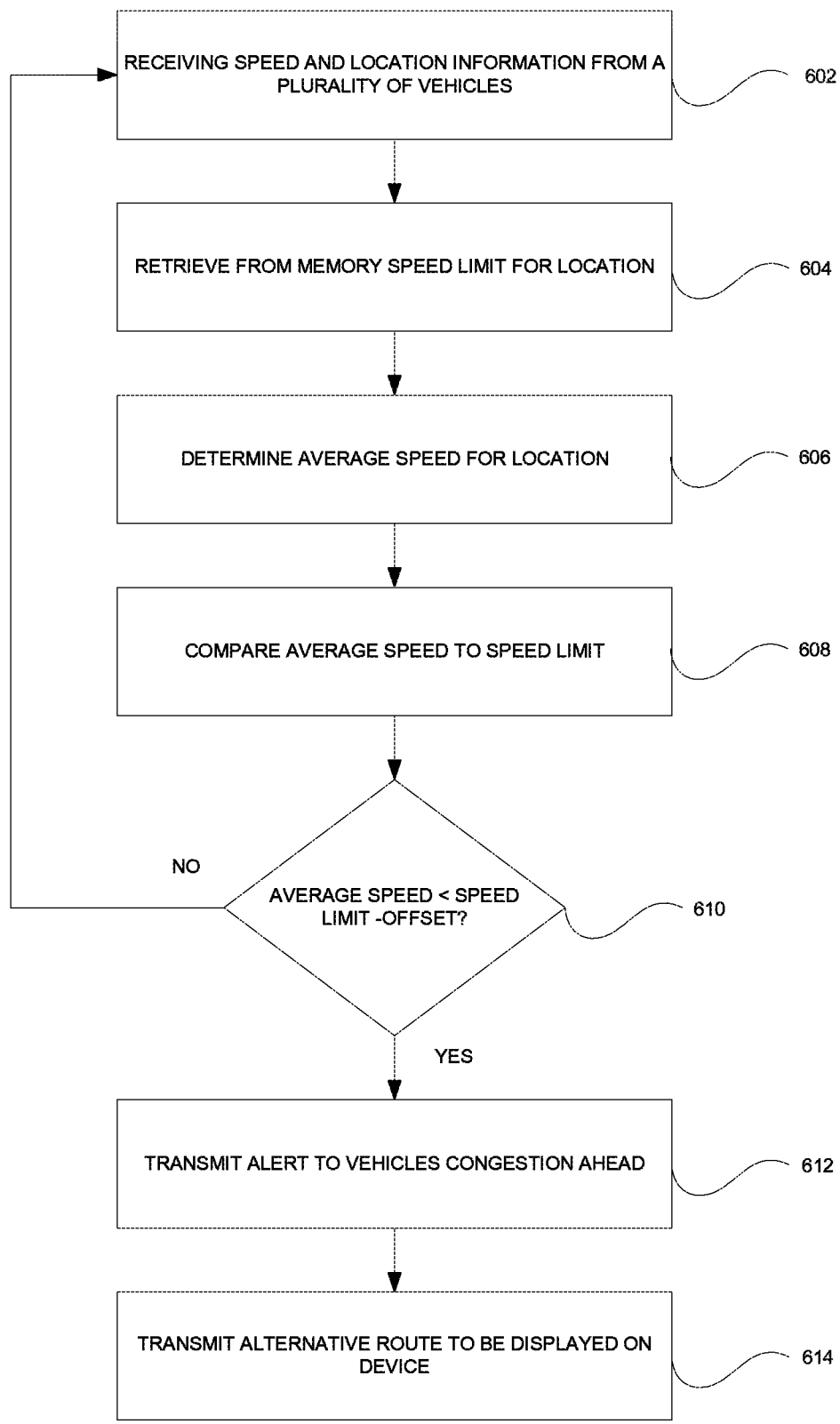
FIG. 6 is a flow diagram illustrating a method for providing information to a plurality of vehicles based on location and speed of the plurality of vehicles.

In another embodiment of the present disclosure, a system and method for communicating a subject vehicle's speed to a central server where it can be utilized to analyze traffic congestion patterns or notify selected companies or individuals will be described in relation to FIGS. 5 and 6. Referring to FIG. 5, the GPS device 100 will communicate to a central server 504 via a communication network 502. The device 100 will couple to the communications network 502 via the transmission module 112 which enable data transmission. The transmission module 112 may connect to the communications network 502 by any known communication means includes WiFi connectivity via a WiFi tower (e.g., of various types including 802.11a/b/g), infrared connectivity, satellite communications, radio frequency, a mobile terminal communications tower, e.g., cellular, PCS, etc.

The server 504 may be connected to the communications network 502, e.g., the Internet, by any known means, for example, a hardwired or wireless connection 508, such as dial-up, hardwired, cable, DSL, satellite, cellular, PCS, wireless transmission (e.g., 802.11a/b/g), etc. It is to be appreciated that the network 502 may be a local area network (LAN), wide area network (WAN), the Internet or any known network that couples a plurality of computers to enable various modes of communication via network messages. Furthermore, the server 504 will communicate using the various known protocols such as Transmission Control Protocol/Internet Protocol (TCP/IP), File Transfer Protocol (FTP), Hypertext Transfer Protocol (HTTP), etc. and secure protocols such as Internet Protocol Security Protocol (IPSec), Point-to-Point Tunneling Protocol (PPTP), Secure Sockets Layer (SSL) Protocol, etc.

In this embodiment, once the processing module 120 has determined the speed that the subject vehicle is traveling at, the location of that vehicle and the time and date of the speed reading, this information will be sent (with the users election) by the transmission module 112 to the remote computer server 504. This server will receive this information from the device 100 and plot this information in a database 506. The database 506 will contain information on many vehicles that are reporting this information. The database 506 will also contain locational information with speed limits for those locations, such as the geographic maps discussed above. The database will then use standard computer processing algorithms to determine for any given time of day, and/or for any given route selected, what speed vehicles are moving upon average for that roadway (e.g., street, highway, etc.). For example, if 40 cars report that for I-95 in Florida heading south from Sheridan Street in Pembroke Pines up through Ives Diary road the average speed for the trip was 30 miles per hour, this information could then be redistributed to any interested parties. The remote server will select the specific information that would be required for various calculations including but not limited to average speed of travel for a particular distance of road, average for a certain reporting number of vehicles, what estimated percentage of vehicles are obeying or violating posted speed limits, average speed of travel for a certain time of day, or any combination of these and other requested variables. Further, the remote server 504 can set up notification alarms plotted against the posted speed limit of a selected location so that if cars are traveling under or over the posted speed limits the server 504 can alert any requested party.

An illustrative example of the system and method will be described in relation to FIG. 6. Initially, in step 602, the server 504 will receive speed and location information from a plurality of vehicles. The server 504 will retrieve from memory, e.g., database 506, a speed limit for the location of the reporting vehicles (step 604). Next, the server 504 will determine an average speed of the reporting vehicles for the location (step 606), e.g., between two points on a map, and compare the average speed to the retrieved speed limit (step 608). In one embodiment, the server 504 will determine if the average speed is less than the speed limit minus a predetermined offset (step 610). For example, a programmer of the server may choose an offset of 20 mph in a zone where the speed limit is 60 mph. If the average speed is less than the speed limit minus the offset (here, for example, if the average speed in the 60 mph zone was only 30 mph), this may be indicative of traffic congestion. The server 504 may then transmit an alert to the vehicles that congestion is ahead (step 612). The alert may be transmitted directly to the device 100 and displayed on display module 104. Alternatively, the alert may be broadcasted over a radio channel previously selected for travel information or may be sent to a local news station which will in turn broadcast the information over a radio station. Otherwise, if the average speed is not less that the limit minus the offset, the server 504 will continuously monitor the vehicles (step 602 through 610).

Optionally, if there is traffic congestion, the server 504 will determine an alternate route from the information collected and transmit this alternate route information to the device 100 to be displayed on the display module 104 (step 614).

The server 504 may use any of the available information to determine traffic patterns. For example, the server 504 may determine traffic density for a particular location or stretch of road, e.g., how many vehicles passed a particular point over a period of time, typically expressed in number of vehicles per hour. The server 504 may then use the traffic density with the average speed to make further determinations. For example, if the average speed for a location is less than the speed limit minus a predetermined offset and only four vehicles have passed that location in the past hour, e.g., the density is below a predetermined density, the server will determine or estimate that bad weather is in the area and will generate a weather alert. Furthermore, if the server 504 determines that a large number of vehicles have not moved in a predetermined period of time, e.g., the average speed is zero mph, the server 504 will determine that an accident occurred and will generate an alert.

In a further embodiment of the system of the present disclosure, a user of the device may enable a reporting signal to be sent to the server 504 via transmission module 112. This will allow the device 100 to report to the server 504 certain information including a location of GPS device 100, time of location, speed of vehicle at a specific time, violation notice of any posted speed limit, and any other information that the device 100 may have or be able to calculate internally to report the server. This information could then be seen instantly by a recipient on a terminal 510 coupled to the communications network 502 or stored and later viewed by the recipient by accessing the information at the server 504 via a conventional Internet browser, e.g., Microsoft™ Internet Explorer. This would apply to an employer who, for instance, wants to be alerted if his employee is speeding in the company car. Moreover, a parent who wants to know if their child is obeying (or breaking) the speed limits. Optionally, the recipient may receive notifications or warnings of violations through the communications network instantly via an e-mail message, an instant message, a recorded phone call, etc. Furthermore, this information may be encrypted and stored locally in the storage module to be later retrieved by the recipient for analysis.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed:

1. A method for execution by a computing system comprising one or more processors, the method comprising:
   determining, by the computing system, based on location information and speed information for a plurality of devices, that an average speed of one or more of the plurality of devices within a region is below a threshold speed associated with the region; and
   transmitting, from the computing system to a device in a vehicle, information related to congestion in the region, wherein the information related to congestion in the region causes the device in the vehicle to present a route that avoids the congestion in the region.

2. The method of claim 1, further comprising receiving, by the computing system via a network, the location information and speed information about the plurality of devices, wherein each device of the plurality of devices is configured to determine location information and speed information corresponding to the device.

3. The method of claim 1, wherein the information related to congestion in the region causes the device in the vehicle to present an alert regarding congestion in the region.

4. The method of claim 1, wherein determining that an average speed of one or more of the plurality of devices within the region is below a threshold speed associated with the region includes determining the threshold speed based on a speed limit associated with the region.

5. The method of claim 4, wherein determining the threshold speed based on the speed limit associated with the region includes determining the threshold speed based on the speed limit associated with the region and a predetermined offset amount below the speed limit.

6. The method of claim 1, wherein the region is a portion of a road.

7. A computing system comprising:
   at least one processor; and
   a non-transitory computer-readable medium having computer-executable instructions stored thereon that, in response to execution by the at least one processor, causes the system to perform actions comprising:
      determining, by the computing system, based on location information and speed information for a plurality of devices, that an average speed of one or more of the plurality of devices within a region is below a threshold speed associated with the region; and
      transmitting, from the computing system to a device in a vehicle, information related to congestion in the region, wherein the information related to congestion in the region causes the device in the vehicle to present a route that avoids the congestion in the region.

8. The computing system of claim 7, wherein the actions further comprise receiving, by the computing system via a network, the location information and speed information about the plurality of devices, wherein each device of the plurality of devices is configured to determine location information and speed information corresponding to the device.

9. The computing system of claim 7, wherein the information related to congestion in the region causes the device in the vehicle to present an alert regarding congestion in the region.

10. The computing system of claim 7, wherein determining that an average speed of one or more of the plurality of devices within the region is below a threshold speed associated with the region includes determining the threshold speed based on a speed limit associated with the region.

11. The computing system of claim 10, wherein determining the threshold speed based on the speed limit associated with the region includes determining the threshold speed based on the speed limit associated with the region and a predetermined offset amount below the speed limit.

12. The computing system of claim 7, wherein the region is a portion of a road.

13. A non-transitory computer-readable medium having instructions stored thereon that, in response to execution by one or more processors of a computing system, cause the computing system to perform actions comprising:
   determining, by the computing system, based on location information and speed information for a plurality of devices, that an average speed of one or more of the plurality of devices within a region is below a threshold speed associated with the region; and
   transmitting, from the computing system to a device in a vehicle, information related to congestion in the region, wherein the information related to congestion in the region causes the device in the vehicle to present a route that avoids the congestion in the region.

14. The computer-readable medium of claim 13, wherein the actions further comprise receiving, by the computing system via a network, the location information and speed information about the plurality of devices, wherein each device of the plurality of devices is configured to determine location information and speed information corresponding to the device.

15. The computer-readable medium of claim 13, wherein the information related to congestion in the region causes the device in the vehicle to present an alert regarding congestion in the region.

16. The computer-readable medium of claim 13, wherein determining that an average speed of one or more of the plurality of devices within the region is below a threshold speed associated with the region includes determining the threshold speed based on a speed limit associated with the region.

17. The computer-readable medium of claim 16, wherein determining the threshold speed based on the speed limit associated with the region includes determining the threshold speed based on the speed limit associated with the region and a predetermined offset amount below the speed limit.

* * * * *